US008042589B2

(12) United States Patent
Hanada

(10) Patent No.: US 8,042,589 B2

(45) Date of Patent: Oct. 25, 2011

(54) CLEANING UNIT AND PRINTER

(75) Inventor: Atsushi Hanada, Nishitokyo (JP)

(73) Assignee: TEAC Corporation, Tama-shi, Tokyo (JP)

( * ) Notice: Subject to any disclaimer, the term of this patent is extended or adjusted under 35 U.S.C. 154(b) by 532 days.

(21) Appl. No.: 12/211,025

(22) Filed: Sep. 15, 2008

(65) Prior Publication Data

US 2009/0095182 A1 Apr. 16, 2009

(30) Foreign Application Priority Data

Oct. 10, 2007 (JP) ................................ 2007-264740
Oct. 10, 2007 (JP) ................................ 2007-264741
Oct. 10, 2007 (JP) ................................ 2007-264742

(51) Int. Cl.

*B29C 65/18* (2006.01)
*B32B 37/00* (2006.01)
*B32B 38/10* (2006.01)
*B32B 38/14* (2006.01)
*B32B 39/00* (2006.01)
*B32B 43/00* (2006.01)

(52) U.S. Cl. ......... 156/389; 156/535; 156/538; 101/425

(58) Field of Classification Search .................. 156/230, 156/234, 235, 237, 238, 240, 281, 389, 535, 156/538; 101/425

See application file for complete search history.

(56) References Cited

U.S. PATENT DOCUMENTS 3,477,083 A 11/1969 Park
3,826,915 A 7/1974 Giolitti
4,464,985 A * 8/1984 Asanuma et al. ............... 100/47
4,910,533 A * 3/1990 Sasaki et al. .................. 347/178
5,326,179 A 7/1994 Fukai
5,365,308 A * 11/1994 Ozawa et al. .................. 355/74
5,892,531 A 4/1999 Mistyurik
6,513,806 B2 2/2003 Yui
6,722,649 B2 4/2004 Yui
6,879,333 B2 4/2005 Furuyama
7,419,257 B2 * 9/2008 Mouri et al. .................. 347/103
2005/0095049 A1 5/2005 Yoshida
2005/0270351 A1 12/2005 Mouri

FOREIGN PATENT DOCUMENTS

EP 1 162 074 A1 12/2001
JP 1-297283 A 11/1989
JP 5-104841 A 4/1993
JP 7-1809 A 1/1995
JP 09114305 A * 5/1997
JP 10-76738 A 3/1998
JP 2000267510 A * 9/2000
JP 2005-132048 A 5/2005
JP 2005132048 A 5/2005
JP 2005-306007 A 11/2005

OTHER PUBLICATIONS

English Abstract of JP 09-114305A (2011).*

(Continued)

*Primary Examiner* — Philip Tucker
*Assistant Examiner* — Sing P Chan
(74) *Attorney, Agent, or Firm* — Seed IP Law Group PLLC

(57) ABSTRACT

An apparatus for efficiently cleaning a platen roller of a printer. A cleaning unit is attached to a main unit in place of a removal unit for an intermediate transfer sheet. A cam is turned by means of turning an arm UP/DOWN lever, and the arm is turned from an UP position to a DOWN position by means of the cam, to thus bring a cleaning pad on a leading end of the arm into contact with a platen roller and perform cleaning operation. When an operation mode is set to a cleaning mode and when attachment of the cleaning unit UC is detected, the platen roller is rotated, thereby allowing cleaning operation.

14 Claims, 8 Drawing Sheets

OTHER PUBLICATIONS

Machine English Translation of JP 09-114305A (Mar. 11, 2011).*

English Abstract of 2000-267510A (2000).*

European Search Report mailed Apr. 9, 2009, issued in corresponding European Application No. 08 16 4005, filed Sep. 9, 2008.

European Search Report, dated Sep. 20, 2010, for EP 10 16 5526.4, 10 pages.

Partial European Search Report mailed Feb. 20, 2009, issued in corresponding Application No. EP 08164005.4, filed Sep. 9, 2008.

Office Action relating to Chinese Patent Application No. 200810166284.6, mailed Dec. 4, 2009, 6 pages.

English Language Translation of Office Action relating to Chinese Patent Application No. 200810166284.6, mailed Dec. 4, 2009, 8 pages.

* cited by examiner

CLEANING UNIT AND PRINTER

PRIORITY INFORMATION

This application claims priority to Japanese Patent Application No. 2007-264740 filed on Oct. 10, 2007, No. 2007-264741 filed on Oct. 10, 2007, and No. 2007-264742 filed on Oct. 10, 2007 which are incorporated herein by reference in its entireties.

BACKGROUND

1. Technical Field

The present invention relates to a cleaning unit and a printer equipped with the cleaning unit, and more particularly cleaning of a platen roller for printing an image on a medium.

2. Related Art

A printer for printing a desired image on a medium plane of a CD, a DVD, or the like, (for label printing) has hitherto been known. In a case where, in such a printer, a full-color image is transferred onto an intermediate transfer sheet through use of a platen roller and where the intermediate transfer sheet is brought into close contact with a label plane of the medium, to thus print the image, the platen roller must be periodically cleaned.

Cleaning of the platen roller is usually performed along the following procedures.

(1) Set the printer to a cleaning mode by means of an operation panel.

(2) Open a door of the printer, and withdraw a removal unit (a ribbon cartridge) for the intermediate transfer sheet.

(3) Rotate the platen roller by means of the operation panel of the printer.

(4) Press a cleaning plate soaked with droplets of cleaning fluid against the platen roller and slowly move the cleaning plate back and forth several times, to thus remove stains.

(5) Stop the platen roller, and again attach the removal unit for the intermediate transfer sheet.

A basic configuration of the printer is described in JP 2005-132048 A. Further, JP 5-104841 A includes separately providing an ink ribbon with a plurality of ink-soaked zones classified by color and a cleaning zone; and wiping, in the cleaning zone of the ink ribbon, ink adhering to a ribbon mask that partitions an ink ribbon from a sheet. JP 7-1809 A includes providing a cleaning tape in place of an ink ribbon in a cartridge case and attaching the cartridge case, as it is, to a printer, thereby cleaning a print head. JP 10-76738 A describes a cleaning cassette that houses a cleaning tape formed by shaping, into the form of a tape, Japanese paper or a synthetic resin film whose both surfaces are thinly affixed with Japanese paper. The cleaning cassette is set on a thermal printer, and the cleaning tape is taken up by means of a take-up reel, thereby clearing dirt or stains from the print head and the platen roller. JP 2005-306007 A describes a cleaning cassette having a cleaning sheet for cleaning the surface of a thermal head and the surface of a platen roller by means of causing the cleaning sheet to travel between the thermal head and the platen roller.

Under a method for cleaning the platen roller by insertion of the cleaning plate, the cleaning plate must be inserted while attention is paid to the structure of surroundings of the platen roller, and low workability is attained. The platen roller may also be damaged. Further, an individual difference may also arise in connection with a cleaning effect.

SUMMARY

The present invention provides an apparatus capable of efficiently cleaning a platen roller.

The present invention is directed toward provision of a cleaning unit for a printer having a platen roller for transferring a print image on a sheet and a main unit equipped with a transfer roller for bringing the sheet with the transferred print image into close contact with a medium and a removal unit that is positioned and attached with respect to the main unit and that feeds the sheet to the platen roller, the cleaning unit being essentially identical with the removal unit in terms of an external shape, being able to be positioned and attached with respect to the main unit in place of the removal unit, and comprising:

an arm that is placed in the vicinity of the platen roller when positioned and attached and that is freely turnable between a first position and a second position around a support shaft supported in a cantilever fashion;

a cleaning pad provided at a leading end of the arm;

a cam that is provided on a rotary shaft and that is brought into contact with the arm by means of rotation effected around the rotary shaft, thereby turning the arm from the first position to the second position; and a spring that forces the arm toward the first position, to thus return the arm from the second position to the first position, wherein the cleaning pad is separated from the platen roller when the arm is situated at the first position by means of the cam, and the cleaning pad contacts the platen roller when the arm is turned to the second position by means of the cam.

The present invention is also directed toward provision of a cleaning unit for a printer having a platen roller for transferring a print image on a sheet and a main unit equipped with a transfer roller for bringing the sheet with the transferred print image into close contact with a medium and a removal unit that is positioned and attached with respect to the main unit and that feeds the sheet to the platen roller, the cleaning unit being essentially identical with the removal unit in terms of an external shape, being able to be positioned and attached with respect to the main unit in place of the removal unit, and comprising:

an arm that is placed in the vicinity of the platen roller when positioned and attached and that is freely turnable between a first position and a second position around a support shaft supported in a cantilever fashion;

a cleaning pad provided at a leading end of the arm;

a cam that is provided on a rotary shaft and that is brought into contact with the arm by means of rotation effected around the rotary shaft, thereby turning the arm from the first position to the second position; and a regulation unit that is provided on the rotary shaft and that does not interfere with the main unit when the arm is located at the first position and is turned to a position where the regulation unit interferes with the main unit when the arm is located at the second position, wherein the cleaning pad is separated from the platen roller when the arm is situated at the first position by means of the cam, and removal of the cleaning unit from the main unit is allowed as a result of noninterference of the regulation unit with the main unit; and the cleaning pad contacts the platen roller when the arm is turned to the second position by means of the cam, and removal of the cleaning unit from the main unit is regulated by interference of the regulation unit with the main unit.

Further, the present invention is directed toward provision of a printer comprising:

a platen roller for transferring a print image on a sheet;

a main unit having a transfer roller for bringing the sheet with a transferred print image into close contact with a medium;

a removal unit that is positioned and attached with respect to the main unit and that feeds the sheet to the platen roller;

a mode setting switch that enables selective setting of either a normal operation mode and a cleaning mode;

a detection unit that is essentially identical with the removal unit in terms of an external shape and that detects attachment of the cleaning unit, which can be positioned with respect to the main unit, in place of the removal unit; and a drive unit that rotationally drives the platen roller for a predetermined period of time when the cleaning mode is set by means of the mode setting switch and when attachment of the cleaning unit is detected by the detection unit.

The invention will be more clearly comprehended by reference to the embodiments provided below. However, the following embodiments are merely illustrative, and the scope of the invention is not limited to the embodiments.

BRIEF DESCRIPTION OF THE DRAWINGS

Preferred embodiments of the present invention will be described in detail by reference to the following drawings, wherein.

DETAILED DESCRIPTION

<Overall Configuration>

Figure 7:
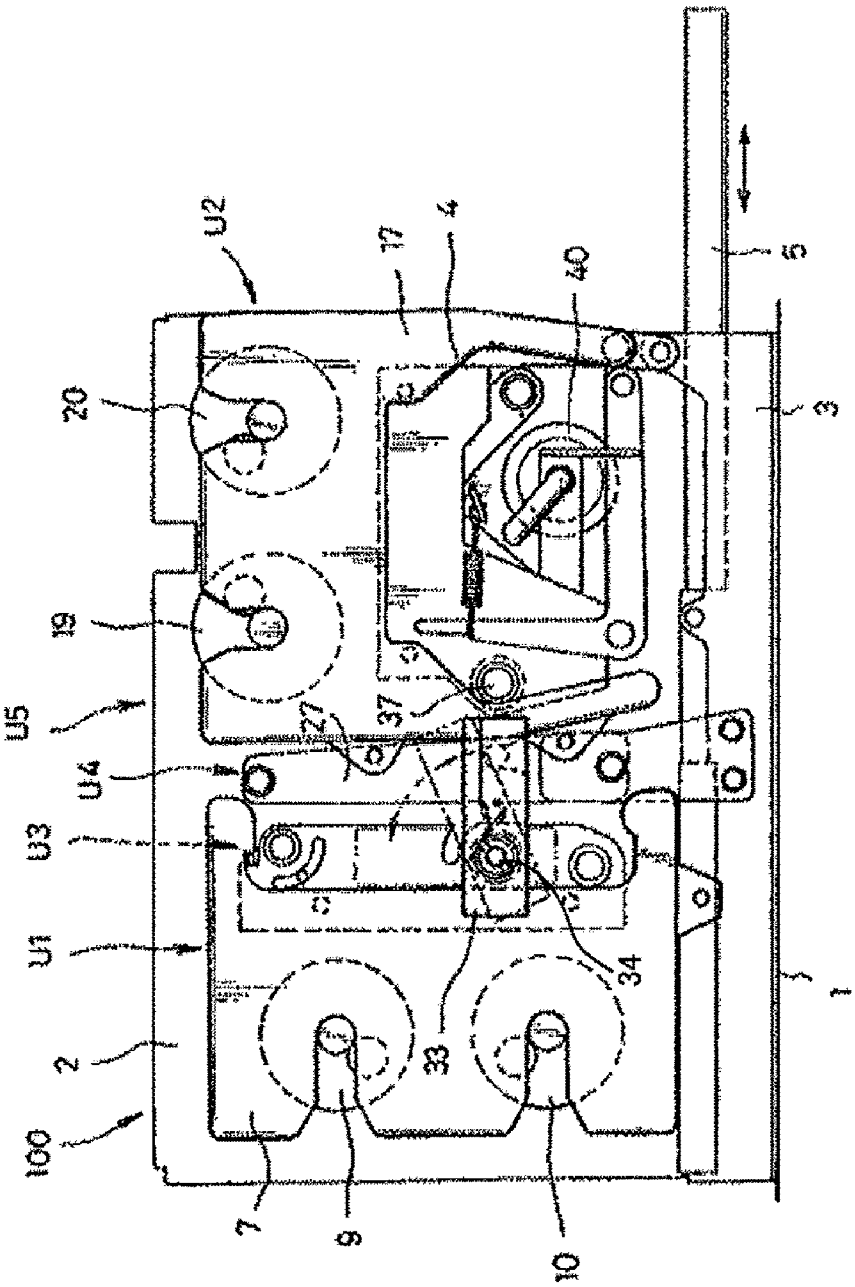
FIG. 7 is a schematic diagram of a related-art printer.
Figure 8:
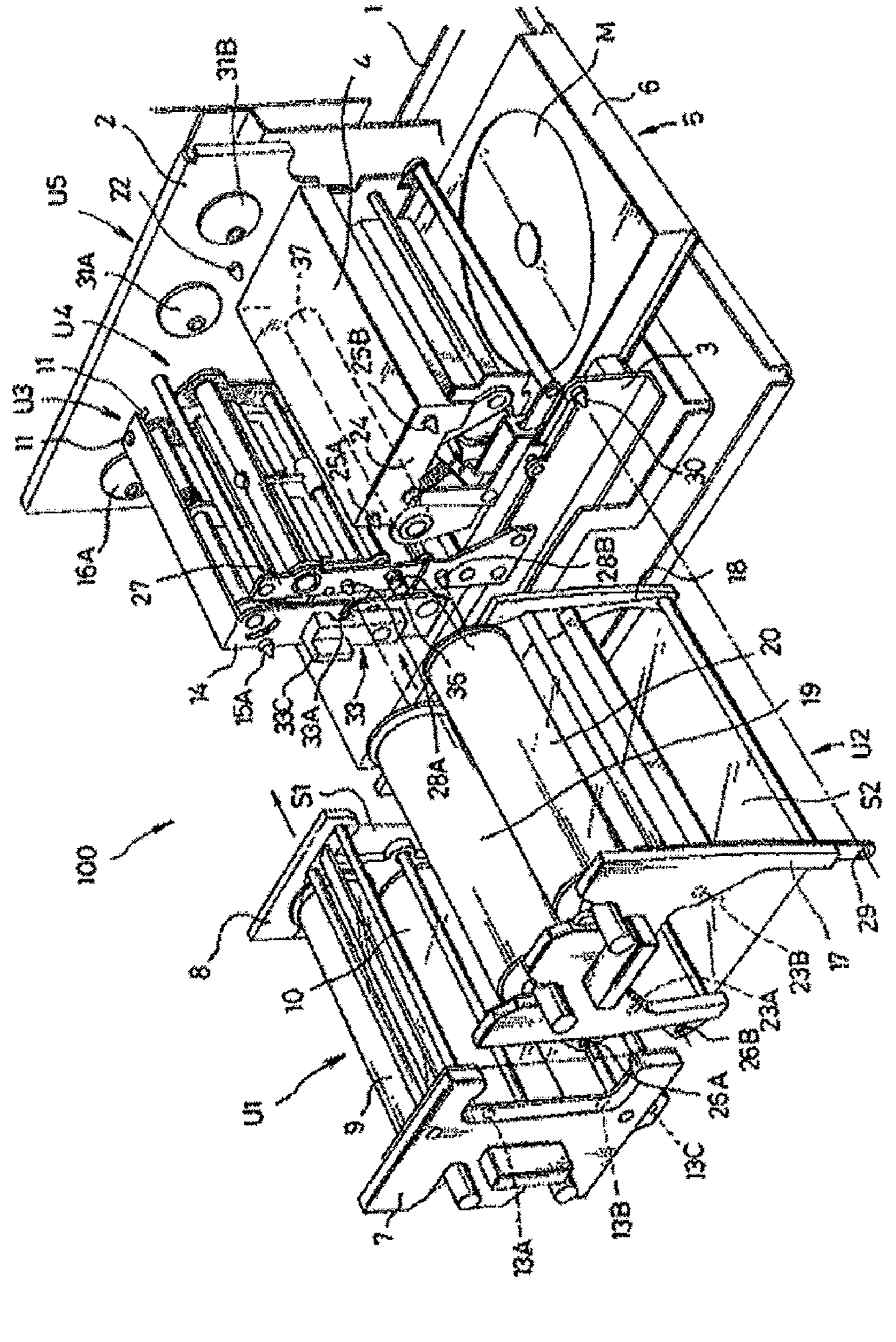
FIG. 8 is a schematic diagram of the related-art printer.

First, the overall configuration of a present embodiment will now be described. FIGS. 7 and 8 show the overall configuration of a printer of the present embodiment. The overall configuration is identical with a configuration described in 2005-132048 A. A printer 100 is made up of a first removal unit U1 consisting of an ink ribbon cassette; a second removal unit U2 consisting of an intermediate transfer sheet cassette; and a main unit U5 formed so as to enable removable attachment of the first removal unit U1 and the second removal unit U2.

The main unit U5 has a chassis 1 having a support plate 2 standing on a rear side thereof, and a head unit U3 and a pinch roller unit U4 are attached, while being supported in a cantilever fashion, to a front side of the support plate 2. An image transfer unit 4 and a print matter conveyance unit 5 are attached to the chassis 1. The print matter conveyance unit 5 is disposed on a lower side of the image transfer unit 4 in such a way that a tray 6 becomes movable in a horizontal direction; that a print matter M, such as a CD and a DVD, held on the tray 6 is taken into a location below the image transfer unit 4 from the right side of the printer; and that the print matter can be externally conveyed from the right side of the printer after an image has been transferred to the print matter.

The first removal unit U1 has a front side plate 7 and a rear side plate 8, and an ink ribbon feed bobbin 9 and an ink ribbon take-up bobbin 10 that are arranged in a vertical direction are rotatably interposed in a stretched manner between the plates. The first removal unit U1 is slid and pushed into a direction of an arrow shown in FIG. 8 while the head unit U3 is taken as a guide, whereby the first removal unit contacts a protuberance 11 that is formed in a projecting manner in the vertical and horizontal directions on an area of the head unit U3 facing the support plate 2, and a rear part of the first removal unit U1 facing the support plate 2 is hereby positioned. Vertically-arranged two bosses 15A and 15B (which are not in the drawing) for fixed-engagement purposes provided on the front side plate 14 of the head unit U3 and a boss 15C (which is not in the drawing) for fixed-engagement purpose provided on a front side of the chassis 1 are fitted to vertically-arranged three fixed-engagement holes 13A, 13B, and 13C opened in the front side plate 7, whereby the front side of the first removal unit U1 is positioned. When the first removal unit is thus positioned and supported, a circular recess provided in the rear of an ink ribbon feed bobbin 9 and a circular recess provided in the rear of the ink ribbon take-up bobbin 10 fit to vertical two rotary shafts (an upper rotary shaft 16A is shown in FIG. 8) formed on the front side of the support plate 2 so as to project in the form of a bowl, whereupon the first removal unit is attached to the main unit U5. A lower rotary shaft is driven by an unillustrated motor, and the lower ink ribbon take-up bobbin 10 is rotationally driven. An ink ribbon S1 wound around the ink ribbon feed bobbin 9 by means of the thus-rotating ink ribbon take-up bobbin 10 is taken up by the ink ribbon take-up bobbin 10 by way of the head unit U3 by means of a plurality of guide rollers.

The second removal unit U2 has on both sides thereof a front side plate 17 and a rear side plate 18, and an intermediate transfer sheet feed bobbin 19 and an intermediate transfer sheet take-up bobbin 20 are rotatably interposed between the side plates in a stretched manner. The second removal unit U2 is slid and pushed into the direction of the arrow shown in FIG. 8 while the image transfer unit 4 is taken as a guide, a boss 22 for fixed-engagement purpose provided on the front surface side of the support plate 2 fits to a fixed-engagement hole 21 (not shown) opened in the rear side plate 18, to thus position the rear side of the second removal unit facing the support plate 2. Two laterally-arranged bosses 25A and 25B for fixed-engagement purposes provided on the front side plate 24 of the image transfer unit 4 fit to two laterally-arranged fixed-engagement holes 23A, 23B opened in the center of the front side plate 17. Two vertically-arranged holes 26A, 26B for fixed-engagement purpose opened in the left side of the second removal unit fit to two vertically-arranged bosses 28A, 28B for fixed-engagement purposes formed in the front side plate 27 of the pinch roller unit U4. A fixed-engagement hole 29 opened in a lower right portion of the second removal unit fits to a boss 30 for fixed-engagement purpose formed in a front surface side of the front support plate 3 provided on the chassis 1, whereby the front side of the second removal unit is positioned. When the second removal unit is thus positioned and supported, a circular recess provided in the rear of the intermediate transfer sheet feed bobbin 19 and a circular recess provided in the rear of the intermediate transfer sheet take-up bobbin 20 fit to two laterally-arranged rotary shafts 31A, 31B formed on the front side of the support plate 2 so as to project in the form of a bowl, whereby the second removal unit is attached to the main unit U5. The two laterally-arranged rotary shafts 31A, 31B are driven, as appropriate, by means of selective driving of unillustrated two motors. It is also possible for the intermediate transfer sheet take-up bobbin 20 to take up the intermediate transfer sheet S2 wound around the intermediate transfer sheet feed bobbin 19 by way of the pinch roller unit U4 and the image transfer unit 4 by means of a plurality of guide rollers, or it is also possible to rewind in reverse the intermediate transfer sheet by the intermediate transfer sheet feed bobbin 19 from the intermediate transfer sheet take-up bobbin 20.

A unit fixing unit 33 is pivotally fixed to a front side plate 14 of the head unit U3 by means of a spindle 34 and able to sway within a vertical plane. The unit fixing unit 33 is provided with a grip 33C for operation purpose. The first removal unit U1 and the second removal unit U2 are attached to the main unit U5, and the unit fixing unit 33 is turned clockwise to a laid-down position, to thus fit a boss 36 into a recess 33A. Further, the head unit U3 and the pinch roller unit U4 are linked together by way of the unit fixing unit 33, and the first removal unit U1 and the front side plate 7 are pressed by the left end side of the unit fixing unit 33. The front side plate 17 of the second removal unit U2 is pressed by the right side of the unit fixing unit 33, whereby the first removal unit U1 and the second removal unit U2 are prevented from forwardly coming out of the main unit U5. In the mean time, when the unit fixing unit 33 is turned counterclockwise to a standup position, removal and attachment of the first removal unit U1 and the second removal unit U2 from and to the main unit U5 become feasible.

In such a configuration, the ink ribbon S1 wound around the ink ribbon take-up bobbin 10 from the ink ribbon feed bobbin 9 is guided by means of a plurality of guide rollers, to thus pass through the head unit U3. The intermediate transfer sheet S2 wound around the intermediate transfer sheet take-up bobbin 20 from the intermediate transfer sheet feed bobbin 19 is guided by a plurality of guide rollers, to thus pass through the pinch roller unit U4 and the image transfer unit 4.

When the pinch roller unit U4 is turned toward the platen roller 37 of the image transfer unit 4, the intermediate transfer sheet S2 comes into close contact with the platen roller 37 by means of actions of two pinch rollers. The ink ribbon S1 is brought into close contact with the left side of the intermediate transfer sheet S2 remaining in close contact with the platen roller 37, and heating elements of a thermal head of the head unit U3 are selectively heated in that state, whereupon ink on the ink ribbon S1 is melted and transferred to the intermediate transfer sheet S2, to thus generate an image. Four single colors of ink; for instance, black, cyan, magenta, and yellow, are repeatedly arranged in this sequence on the ink ribbon S1 along a longitudinal direction. The ink ribbon S1 is forwardly fed in the direction of an arrow, and the intermediate transfer sheet S2 is rewound toward the intermediate transfer sheet feed bobbin 19 every time a single color of ink is transferred from the ink ribbon S1 and wound on the intermediate transfer sheet take-up bobbin 20 every time the sheet is rewound, and the next single color of ink is transferred to the same image formation area. Through repetition of these operations, four single colors of ink are sequentially transferred, whereby a full-color image is generated on the intermediate transfer sheet S2. An image transfer roller 40 of the image transfer unit 4 internally equipped with a heating unit is hardened, and the intermediate transfer sheet S2 and the print matter M are moved at the same speed while the intermediate transfer sheet S2 is held in close contact with the print matter M on the tray 6, whereby the full-color image generated on the intermediate transfer sheet S2 is transferred to the print matter M, and the print matter M undergoes printing (printing of a label).

<Cleaning Unit>

When the platen roller 37 of the image transfer unit 4 is cleaned, the second removal unit U2 is pulled out, and a cleaning unit (cleaning cartridge) UC is attached, in place of the second removal unit U2, to the main unit U5. An external shape of the cleaning unit UC is made so as to become essentially identical with that of the second removal unit U2. The cleaning unit has a front side plate and a rear side plate as does the second removal unit U2 and is positioned as a result of the image transfer unit 4 being pushed as a guide.

However, unlike the second removal unit U2, the cleaning unit UC does not have the intermediate transfer sheet feed bobbin 19 and the intermediate transfer sheet take-up bobbin 20 and has a cleaning mechanism for cleaning the platen roller 37.

Figure 1:
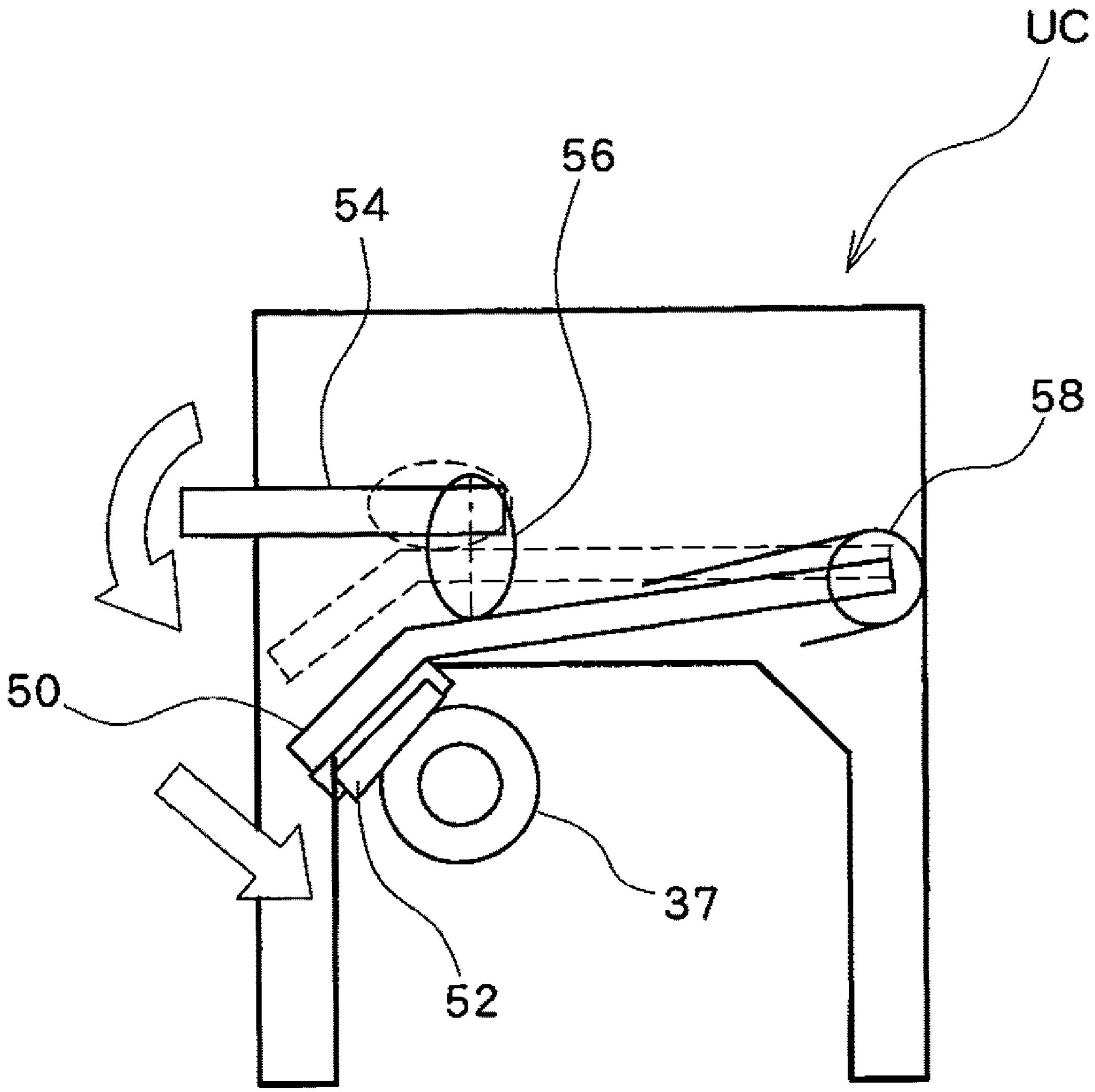
FIG. 1 is a general schematic diagram of a cleaning mechanism of an embodiment.

FIG. 1 shows the general configuration of the cleaning mechanism incorporated in the cleaning unit UC. The cleaning mechanism is supported in a cantilever fashion and made up of an arm 50 having essentially the same width as that of the platen roller 37; a cleaning pad 52 provided at the leading end of the arm 50; an arm UP/DOWN lever 54; a cam 56 that rotates in synchronism with the arm UP/DOWN lever 54 and whose end comes into contact with an extension of the arm 50; and a torsion spring 58 for imparting restoration force so as to return the arm 50 to its initial position. The arm 50 is forcefully held in the initial position indicated by a broken line in the drawing by means of the torsion spring 58. Since the arm 50 is situated at an elevated location at the initial position, the cleaning pad 52 remains separated from the platen roller 37. When the arm UP/DOWN lever 54 is turned in this state in the direction of an arrow (counterclockwise) in the drawing, the cam 56 rotates in synchronism with turning action of the arum UP/DOWN lever 54. The arm 50 rotates around a support shaft against restoration force of the torsion spring 58, whereupon the cleaning pad 52 provided at the leading edge of the arm 50 contacts the platen roller 37. The platen roller 37 is rotated while the cleaning pad 52 remains in contact with the platen roller 37, whereby the platen roller 37 is cleaned. The arm UP/DOWN lever 54 is turned clockwise after completion of cleaning operation, whereby the arm 50 is restored to the initial position by means of restoration force of the torsion spring 58. A compression coil spring (not shown) may also be set in lieu of the torsion spring 58 between the arm 50 and a base 90 of the cleaning unit UC.

Figure 2:
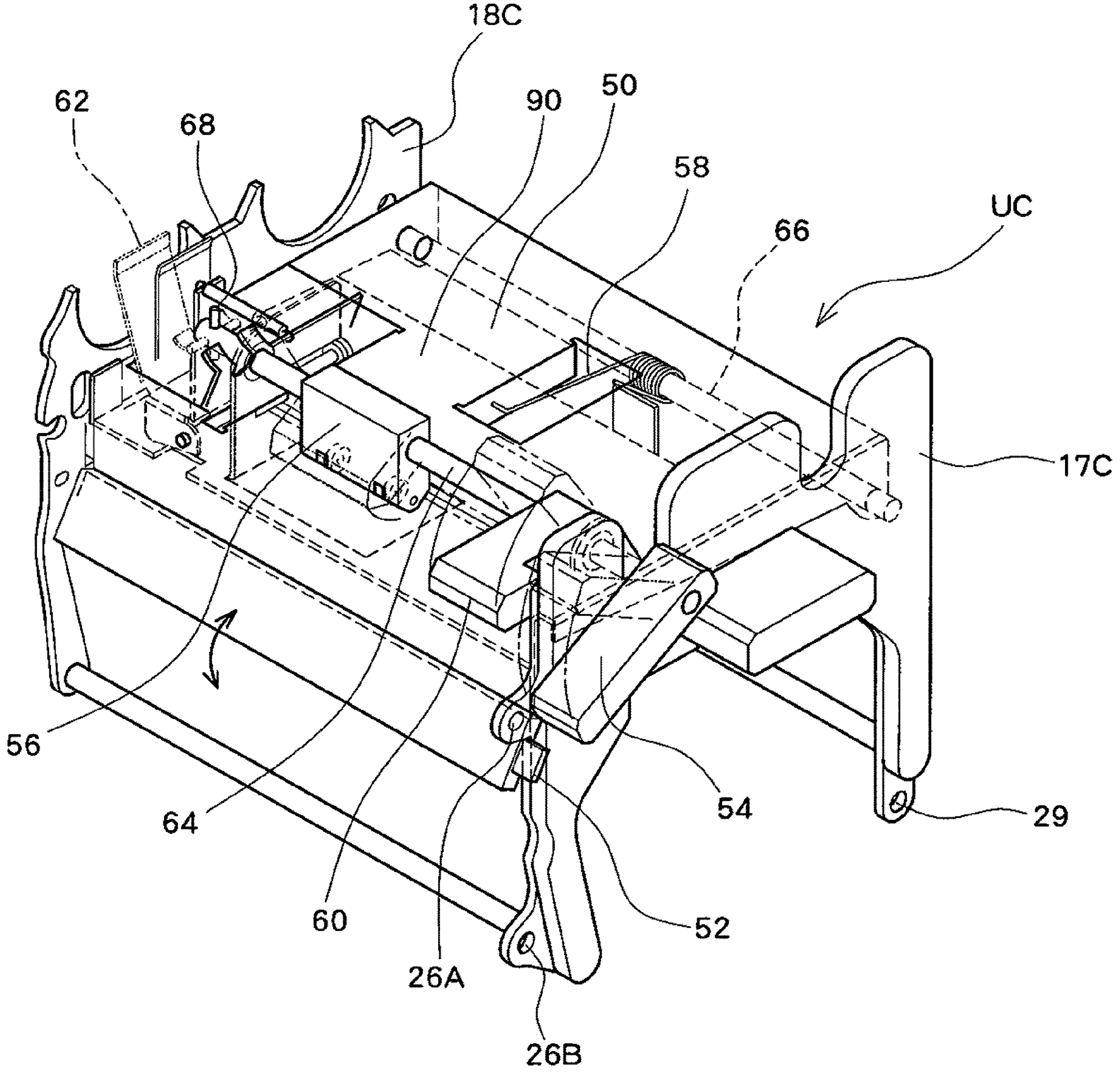
FIG. 2 is a schematic diagram of a cleaning unit of the embodiment.

FIG. 2 shows the detailed configuration of the cleaning mechanism. From the viewpoint of an appearance, the cleaning unit UC is essentially identical with the second removal unit U2 in terms of a shape and a size except that the intermediate transfer sheet feed bobbin 19 and the intermediate transfer sheet take-up bobbin 20 are not present. The cleaning unit UC has a front plate 17C and a rear plate 18C. The front plate 17C is identical in shape and size with the front plate 17 and has on the left side thereof vertically-arranged two holes 26A, 26B for fixed-engagement purpose and in a lower right-side portion a hole 29 for fixed-engagement purpose, as does the front plate 17. Although unillustrated, the front plate 17C has in a middle portion thereof horizontally-arranged two holes for fixed-engagement purpose, as does the front plate 17. By means of these holes, the cleaning unit UC is positioned with respect to the main unit U5. For instance, the vertically-arranged holes 26A, 26B for fixed-engagement purpose respectively fit to vertically-arranged two bosses 28A, 28B for fixed-engagement purpose provided on a front side plate 27 of the pinch roller unit U4.

An arm UP/DOWN lever 54 is pivotally provided on the left side of the front plate 17C. The arm UP/DOWN lever 54 is linked to a rotary shaft 64 extending in a front-to-back direction of the cleaning unit UC, and the rotary shaft 64 rotates in synchronism with turning action of the arm UP/DOWN lever 54. The rotary shaft 64 is provided with, in sequence from front to back, a removal lock lever 60, a cam 56, and a lock mechanism pin 68. The bent arm 50 having the shape of a flat plate having at the leading end thereof the cleaning pad 52 (may also be replaceable) is pivotally supported on a second rotary shaft 66. The torsion spring 58 coiled around the rotary shaft 66 contacts a lower surface of the arm 50, to thus upwardly impel the arm 50 (in a clockwise direction around the rotary shaft 66 when viewed from the front). The arm 50 is situated below the rotary shaft 64 and also below the cam 56. A link mechanism 62 is provided on a rear end of the rotary shaft 64 and controls allowance and regulation of rotation of the lock mechanism pin 68.

Figure 3:
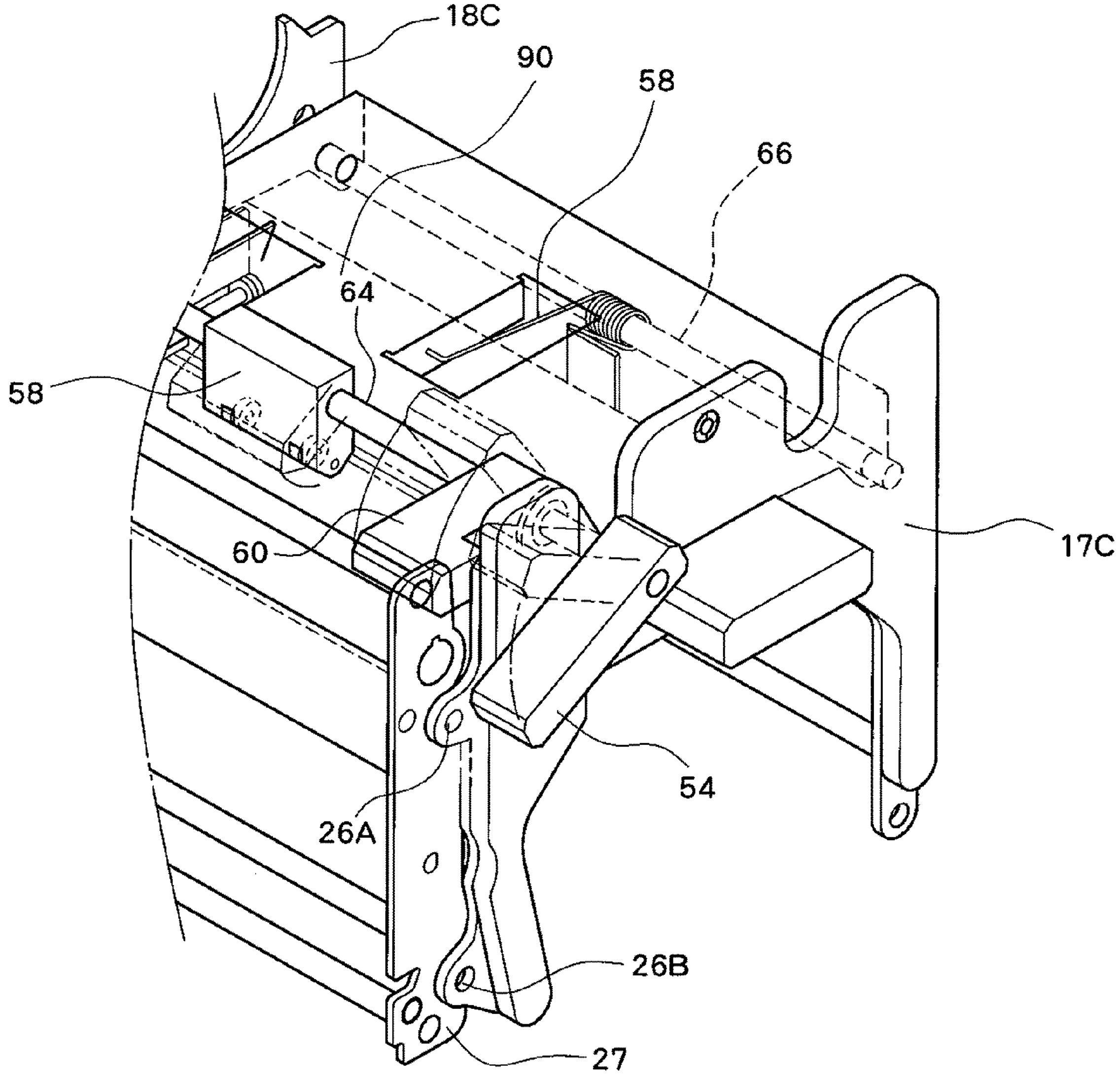
FIG. 3 is a partially-enlarged view of FIG. 2.

In the initial position (an UP position or a first position), the arm UP/DOWN lever 54, the cam 56, the removal lock lever 60, and the arm 50 are situated at a position designated by a broken line. The arm 50 is upwardly impelled by means of the torsion spring 58, and the cleaning pad 52 does not contact the platen roller 37. The arm UP/DOWN lever 54 is turned counterclockwise from the initial position (the DOWN position or the second position), whereupon the rotary shaft 64 rotates, and the cam 56 provided on the rotary shaft 64 also rotates. A leading end of the cam 56 contacts an upper surface of the arm 50, thereby downwardly pushing (turning counterclockwise when viewed from front) the arm 50 against restoration force of the torsion spring 58. By means of turning action of the arm 50, the cleaning pad 52 disposed at the leading end of the arm comes into close contact with the platen roller 37. Further, by means of rotation of the rotary shaft 64, the removal lock lever 60 provided on the rotary shaft 64 rotates. As shown in an enlarged view of FIG. 3, a side surface (indicated by oblique lines in the drawing) of the removal lock lever 60 interferes with the main unit 5; more specifically, the side surface goes toward a rear surface of the front side plate 27 of the pinch roller unit U4, to thus interfere with the front side plate 27 and regulate pullout of the cleaning unit UC. The removal lock lever 60 turns in synchronism with turning action of the arm UP/DOWN lever 54, and hence removal of the cleaning unit UC, which would otherwise arise while the arm UP/DOWN lever 54 is turned from the UP position to a DOWN position and set in the DOWN position, is prevented. Thus, removal of the cleaning unit, which would otherwise be caused while the cleaning pad 52 remains in contact with the platen roller 37, is prevented, whereby infliction of damage to the platen roller 37 is effectively prevented. Attachment and removal of the cleaning unit UC are allowed only when the arm UP/DOWN lever 54 is set at the UP position.

Figure 4:
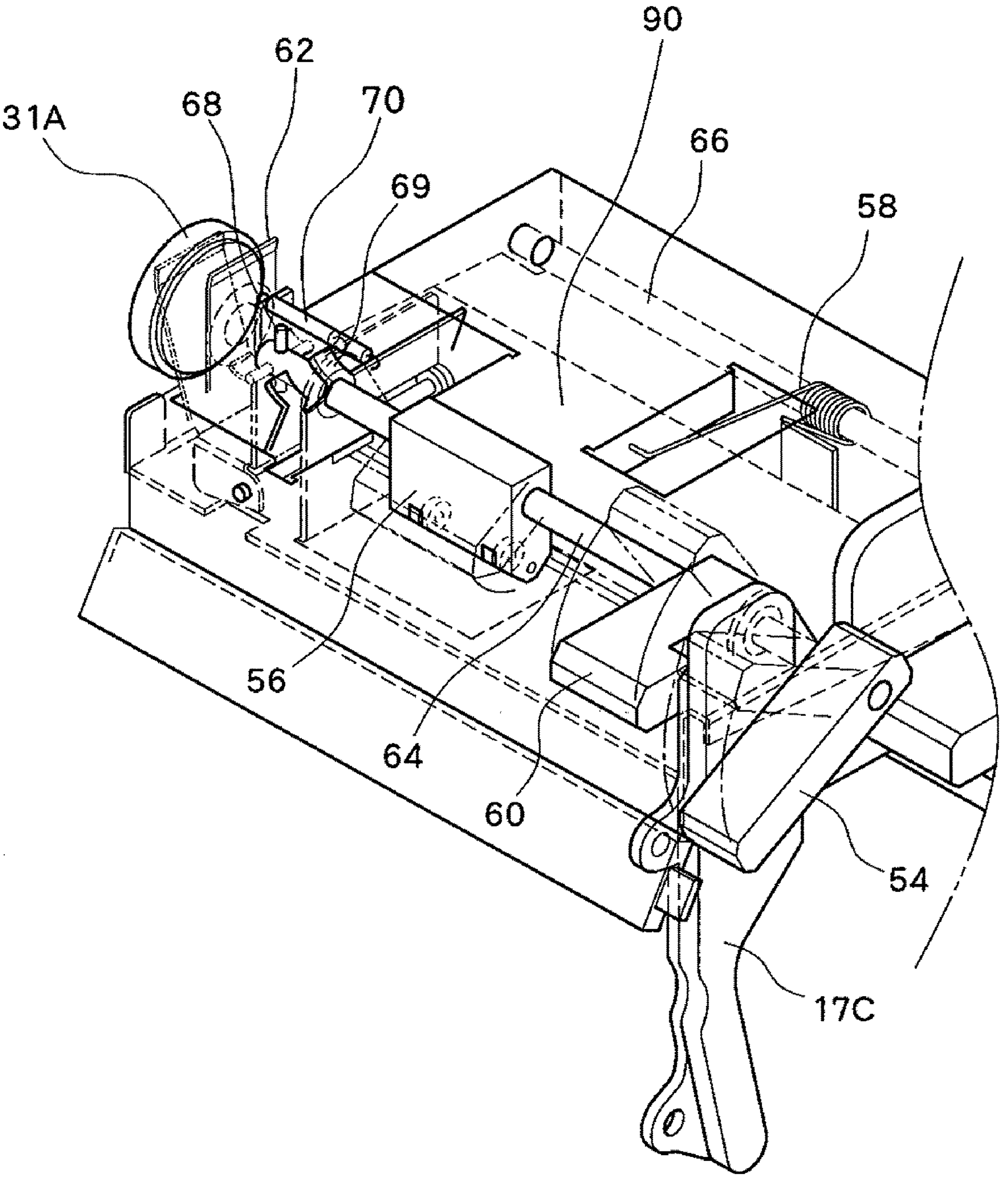
FIG. 4 is a partially-enlarged view of FIG. 2.

As mentioned above, the lock mechanism pin 68 is projectingly formed on the rotary shaft 64, and the lock mechanism pin 68 engages with the link mechanism 62. Specifically, as shown in an enlarged view of FIG. 4, the link mechanism 62 has a link plate having a stand portion opposing the rotary shaft (a reel base) 31A provided, in the form of a bowl, on the front side of the support plate 2; and two claws 69 that are formed integrally with the link plate so as to protrude to the right and the left in such a way that the rotary shaft 64 is sandwiched between the claws. The link plate having the pair of right and left claws 69 is formed in a bent manner in such a way that a longitudinal cross-sectional profile of the link plate assumes the shape of the letter V or U, and a bottom of the link plate is axially supported in a swayable manner by a bottom surface of the cleaning unit UC. When the cleaning unit UC is still present as a single element without being attached to the main unit U5, the link plate is situated while being inclined toward the rear as indicated by a broken line in the drawing. At this time, the pair of right and left claws 69 are situated on the right and the left such that the lock mechanism pin 68 is sandwiched between the claws, to thus regulate the rotation of the lock mechanism pin 68; namely, the rotation of the rotary shaft 64. Therefore, when the cleaning unit UC is present as a single element, turning action of the arm UP/DOWN lever 54 is regulated by the claws 69, thereby preventing unintended turning of the arm UP/DOWN lever to the DOWN position, which would otherwise arise when the arm UP/DOWN lever is in the UP position. The cleaning unit UC is slid, to thus be attached to the main unit U5 while an image processing unit 4 is taken as a guide, the stand portion of the link plate opposing the rotary shaft (the reel base) 31A contacts the rotary shaft (the reel section) 31A, whereby the link plate sways around the shaft, and the claws 69 move to a position indicated by a solid line in the drawing. Since the claws 69 are not present on the right and left sides of the lock mechanism pin 68 in this state, rotation of the lock mechanism pin 68; namely, rotation of the rotary shaft 64, is allowed. Consequently, in a state where the cleaning unit UC is attached to the main unit U5, turning action of the arm UP/DOWN lever 54 is allowed, so that cleaning of the platen roller 37 becomes possible. The cleaning unit UC is removed from the main unit U5, so that the claws 69 sway to their original positions by means of restoration force of the spring 70 and come to right and left positions in such a way that the lock mechanism pin 68 is sandwiched between the claws. Hereby, rotation of the rotary shaft 64; namely, turning action of the arm UP/DOWN lever 54 is regulated.

As mentioned above, in the present embodiment, the cleaning unit UC is attached in lieu of the second removal unit U2 by use of the cleaning unit UC that has the intermediate transfer sheet feed bobbin 19 and the intermediate transfer sheet take-up bobbin 20 and that is identical with the second removal unit U2 in terms of an external shape and a size, whereby the platen roller 37 can be cleaned. Only when the cleaning unit UC is attached, the arm 50 can move by virtue of the actions of the lock mechanism pin 68 and the link mechanism 62. Further, removal of the cleaning unit UC is regulated during cleaning operation by means of the action of the removal lock lever 60. Hence, infliction of damage to the platen roller 37 can be effectively prevented.

Cleaning procedures are performed by means of setting an operation mode from a normal operation mode to a cleaning mode by use of the operation panel provided on the main unit U5; opening a front door of the main unit U5; replacing the second removal unit U2 with the cleaning unit UC; turning the arm UP/DOWN lever 54 from the UP position to the DOWN position; and rotating the platen roller 37. However, it is desirable to carry out the procedures after attachment of the cleaning unit UC to the main unit U5 has been ascertained. Therefore, the cleaning unit UC is desirably provided with a mechanism for ascertaining attachment of the cleaning unit UC by means of a sensor provided on the main unit U5. The mechanism is constituted by a combination of two mechanisms; namely, a mechanism for detecting the presence/absence of the unit and a mechanism for detecting the type of an attached unit. When a unit of some type is detected and when the type of the attached unit is a cleaning unit, attachment of the cleaning unit UC can be detected reliably. The mechanism for detecting a unit may also be a mechanism that detects the second removal unit U2. When the second removal unit U2 cannot be detected, there is a conceivable possibility that no unit is attached or that the cleaning unit UC is attached. Attachment of the cleaning unit UC can be detected by additional use of a mechanism that identifies the type of a unit. For instance, in the case of a configuration where a projection is provided at a predetermined position on the rear side plate 18 of the second removal unit U2; where, when the second removal unit is attached, the projection turns on a unit detection switch of the main unit U5, to thus detect attachment of the unit; and where the color of a core flange of an ink ribbon is detected by means of a photosensor, to thus determine the type of the ink ribbon, the projection is not provided at a predetermined position on the rear side plate 18C of the cleaning unit UC. By means of the configuration, even when the cleaning unit UC is attached, the switch provided on the main unit U5 is not turned on, and hence the second removal unit U2 is identified as not being attached. Further, a white core (the color of the cleaning unit UC) is detected by use of the photosensor, thereby detecting attachment of the cleaning unit UC. When none of the units are attached, the photosensor does not detect the white core, and hence erroneous identification of attachment of the cleaning unit UC does not arise.

Example cleaning procedures of the embodiment are provided below.

(1) Set the mode to a cleaning mode on the operation panel of the printer.

(2) Open the front door of the printer.

(3) Attach the cleaning unit UC.

(4) Release the arm UP/DOWN lever 54 from a locked state by attachment of the cleaning unit UC.

(5) Turn the arm UP/DOWN lever 54 from the UP position to the DOWN position, to thus bring the cleaning pad 52 into contact with the platen roller 37.

(6) Lock removal of the cleaning unit UC by the removal lock lever 60.

(7) Detect attachment of the cleaning unit UC by the printer.

(8) Rotate the platen roller 37 for a given period of time.

(9) Stop rotation of the platen roller 37 after lapse of the predetermined period of time.

(10) Turn the arm UP/DOWN lever 54 from the DOWN position to the UP position, to thus separate the cleaning pad 52 from the platen roller 37.

(11) Locking of removal of the cleaning unit UC performed by the removal lock lever 60 is released.

(12) Remove the cleaning unit UC.

In addition to turning of the removal lock lever 60, the unit fixing unit 33 shown in FIG. 8 may also be turned, to thus prevent removal of the cleaning unit UC. Provided that operation of the unit fixing unit 33 is forgotten, removal of the cleaning unit UC, which would otherwise be caused when the arm 50 is in the DOWN position, is prevented by the removal lock lever 60. Settings may also be made in such a way that the printer operates in a cleaning mode when fixing operation of the unit fixing unit 33 is detected.

The embodiment of the present invention has hitherto been described above, but the present invention is not limited to the embodiment and susceptible to various alterations.

Figure 5:
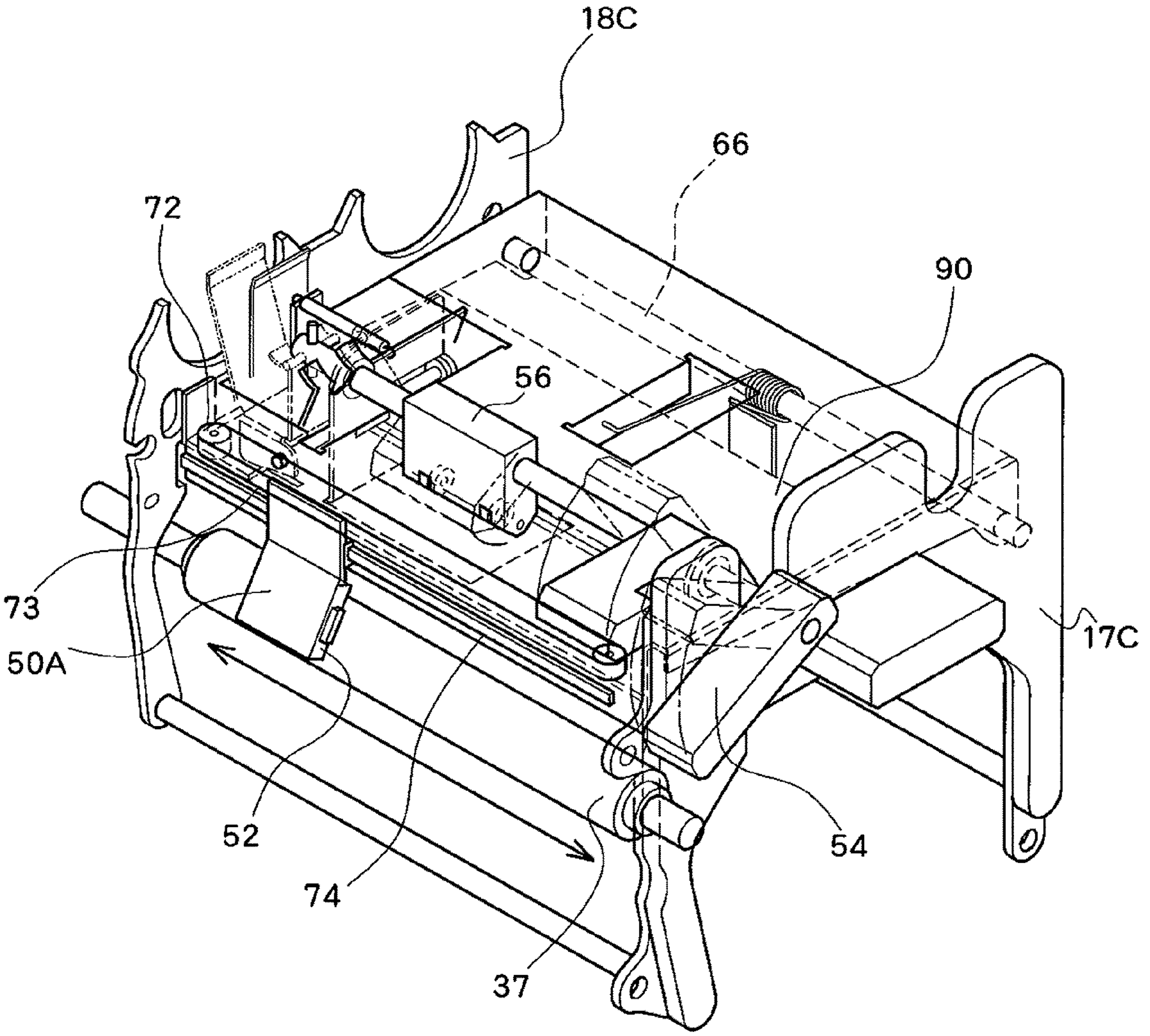
FIG. 5 is a schematic diagram of a cleaning unit of another embodiment.

For instance, in the present embodiment, the width of the arm 50 is made identical with that of the platen roller 37. However, as shown in FIG. 5, there may also be adopted a configuration in which the width of a leading end 50A of the arm 50 is made smaller than the width of the platen roller 37; in which the leading end 50A of the arm 50 is provided so as to be slidable in the direction of an arrow (the front-to-back direction) in the drawing along a linear slide 74; and in which the leading end 50A is made slid by means of a motor 72 and a belt 73, to thus clean the platen roller 37. The control section of the main unit U5 rotates the platen roller 37 and drives the motor 72, to thus slide the leading end 50A in a widthwise direction of the platen roller 37.

Figure 6:
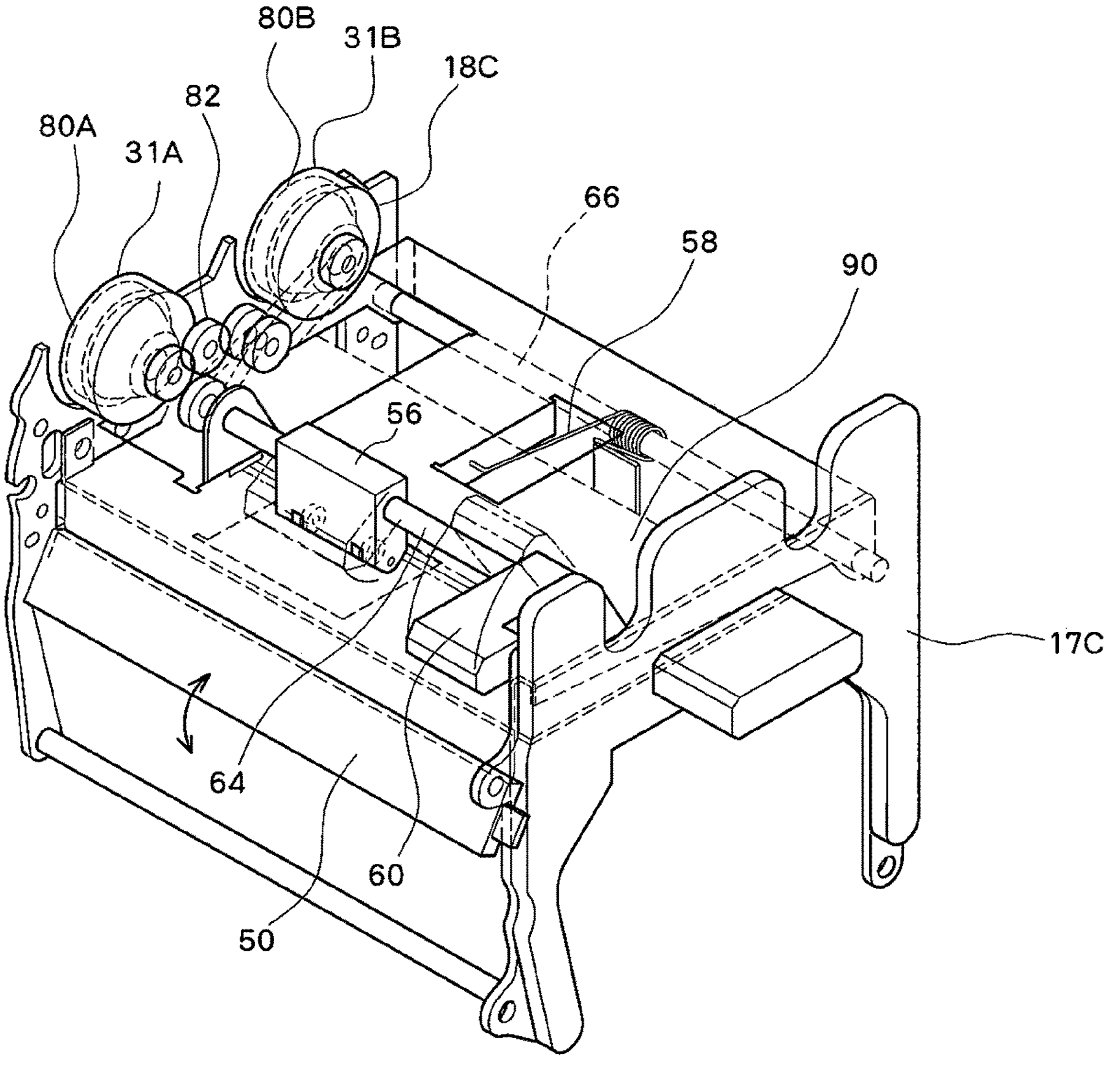
FIG. 6 is a schematic diagram of a cleaning unit of yet another embodiment.

Moreover, in the present embodiment, UP/DOWN action of the arm 50 is manually performed by means of the arm UP/DOWN lever 54, but there may also be adopted a configuration in which the UP/DOWN action of the arm 50 is automatically performed. FIG. 6 shows an example configuration for this case. The arm UP/DOWN lever 54 is not provided at the front end of the rotary shaft 64. A link section 80A to be linked to a drive shaft 31A and a link section 80B to be linked to a drive shaft 31B are provided at a rear end of the rotary shaft 64. The link section 80A is formed into a shape essentially identical with that of the intermediate transfer sheet feed bobbin 19 so as to engage with the drive shaft 31A. The link section 80B is formed into a shape essentially identical with that of the intermediate transfer sheet take-up bobbin 20 so as to engage with the drive shaft 31B. The link sections 80A and 80B are connected to a transmission mechanism 82 made up of a gear and a belt. Driving force of the drive shaft 31A or the drive shaft 31B is transmitted to the rotary shaft 64 by means of the transmission mechanism 82, to thus rotationally drive the rotary shaft 64. When the drive shaft 31B is driven, the arm 50 is turned from the UP position to the DOWN position by means of rotation of the rotary shaft 64, whereupon the cleaning pad 52 contacts the platen roller 37. Further, the removal lock lever 60 is also turned, thereby preventing removal of the cleaning unit UC, which would otherwise arise when the cleaning pad 52 remains in contact with the platen roller 37. In the meantime, when the drive shaft 31A is driven, the arm 50 is turned form the DOWN position to the UP position by means of rotation of the rotary shaft 64, to thus separate the cleaning pad 52 from the platen roller 37. At this time, the removal lock lever 60 is also turned, to thus cancel prevention of removal of the cleaning unit UC.

What is claimed is:

1. A cleaning unit for a printer having a main unit equipped with a platen roller for transferring a print image on a sheet and a transfer roller for bringing the sheet with the transferred print image into close contact with a medium, and a removal unit that is positioned and attached with respect to the main unit and that feeds the sheet to the platen roller, the cleaning unit being essentially identical with the removal unit in terms of an external shape, being able to be positioned and attached with respect to the main unit in place of the removal unit, and comprising:

an arm that is placed in the vicinity of the platen roller when the cleaning unit is positioned and attached and with respect to the main unit, and that is supported in a cantilever fashion and is freely turnable between a first position and a second position around a support shaft;

a cleaning pad provided at a leading end of the arm;

a cam that is provided on a rotary shaft and that is brought into contact with the arm by means of rotation effected around the rotary shaft, thereby turning the arm from the first position to the second position; and a spring that forces the arm toward the first position, to thus return the arm from the second position to the first position, wherein the cleaning pad is separated from the platen roller when the arm is situated at the first position by the cam, and the cleaning pad contacts the platen roller when the arm is turned to the second position by the cam.

2. The cleaning unit according to claim 1, further comprising:

an arm lever that is provided on the rotary shaft and that can be operated in a turnable manner, wherein the cam is rotated by operating the arm lever in a turning fashion, to thus turn the arm from the first position to the second position.

3. The cleaning unit according to claim 2, further comprising:

a pin formed on the rotary shaft in a projecting manner; and a link mechanism that is provided so as to be freely movable along the rotary shaft and that has a pair of claws which are positioned, while the cleaning unit is not attached to the main unit, on both sides of the pin in such a way that the pin is sandwiched between the claws, thereby regulating turning action of the arm lever and which are moved along the rotary shaft by means of the cleaning unit being engaged with the main unit while the cleaning unit is attached to the main unit, to thus be separated from the pin and allow turning action of the arm lever.

4. A cleaning unit for a printer having a main unit equipped with a platen roller for transferring a print image on a sheet and a transfer roller for bringing the sheet with the transferred print image into close contact with a medium, and a removal unit that is positioned and attached with respect to the main unit and that feeds the sheet to the platen roller, the cleaning unit being essentially identical with the removal unit in terms of an external shape, being able to be positioned and attached with respect to the main unit in place of the removal unit, and comprising:

an arm that is placed in the vicinity of the platen roller when the cleaning unit is positioned and attached with respect to the main unit, and that is supported in a cantilever fashion and is freely turnable between a first position and a second position around a support shaft;

a cleaning pad provided at a leading end of the arm;

a cam that is provided on a rotary shaft and that is brought into contact with the arm by means of rotation effected around the rotary shaft, thereby turning the arm from the first position to the second position; and a regulation unit that is provided on the rotary shaft and that does not interfere with the main unit when the arm is located at the first position and is turned to a position where the regulation unit interferes with the main unit when the arm is located at the second position, wherein the cleaning pad is separated from the platen roller when the arm is situated at the first position by the cam, and removal of the cleaning unit from the main unit is allowed as a result of noninterference of the regulation unit with the main unit; and the cleaning pad contacts the platen roller when the arm is turned to the second position by the cam, and removal of the cleaning unit from the main unit is regulated by interference of the regulation unit with the main unit.

5. The cleaning unit according to claim 4, further comprising:

an arm lever that is provided on the rotary shaft and that can be operated in a turnable manner, wherein the cam is rotated by operating the arm lever in a turning fashion, to thus turn the arm from the first position to the second position.

6. The cleaning unit according to claim 5, further comprising:

a pin formed on the rotary shaft in a projecting manner; and a link mechanism that is provided so as to be freely movable along the rotary shaft and that has a pair of claws which are positioned, while the cleaning unit is not attached to the main unit, on both sides of the pin in such a way that the pin is sandwiched between the claws, thereby regulating turning action of the arm lever and which are moved along the rotary shaft by means of the cleaning unit being engaged with the main unit while the cleaning unit is attached to the main unit, to thus be separated from the pin and allow turning action of the arm lever.

7. A printer comprising:

a platen roller for transferring a print image on a sheet;

a main unit having a transfer roller for bringing the sheet with a transferred print image into close contact with a medium;

a removal unit that is positioned and attached with respect to the main unit and that feeds the sheet to the platen roller;

a mode setting switch that enables selective setting of either a normal operation mode and a cleaning mode;

a cleaning unit removably positioned and attached with respect to the main unit, which is essentially identical with the removal unit in terms of an external shape;

a detection unit that detects attachment of the cleaning unit to the main unit, in place of the removal unit; and a drive unit that rotationally drives the platen roller for a predetermined period of time when the cleaning mode is set by the mode setting switch and when attachment of the cleaning unit is detected by the detection unit.

8. The printer according to claim 7, wherein the detection unit includes a first detection unit configured to detect attachment of either the removal unit or the cleaning unit to the main unit; and a second detection configured to determine a type of the attached unit, wherein the detection unit detects attachment of the cleaning unit by a combination of detection results from the first detection unit and the second detection unit.

9. The printer according to claim 8, wherein the cleaning unit has an arm that is placed in the vicinity of the platen roller when the cleaning unit is positioned and attached with respect to the main unit, and that is supported in a cantilever fashion and is turnable about a support shaft between a first position and a second position, and a cleaning pad that is provided at a leading end of the arm, that is separated from the platen roller when the arm is situated at the first position, and that contacts the platen roller when the arm is turned to the second position; and wherein the printer further comprises a second drive unit that turns the arm from the first position to the second position when the cleaning mode is set by the mode setting switch and when attachment of the cleaning unit is detected by the detection unit.

10. The printer according to claim 9, wherein the cleaning unit has a cam that is provided on a rotary shaft and that contacts the arm by means of rotation of the rotary shaft, to thus turn the arm from the first position to the second position, and a gear mechanism configured to rotationally drive the rotary shaft, and wherein the second drive unit drives the gear mechanism by use of a drive shaft for rotationally driving a bobbin for taking up or winding the sheet of the removal unit.

11. The printer according to claim 10, wherein the cleaning unit has a regulation unit that is provided on the rotary shaft and that does not interfere with the main unit when the arm is located at the first position and is turned to a position where the regulation unit interferes with the main unit when the arm is located at the second position, and the regulation unit is caused to interfere with the main unit when the second drive unit turns the arm to the second position, thereby preventing removal of the cleaning unit from the main unit.

12. The printer according to claim 8, wherein the first detection unit comprises a switch configured and positioned on the main unit so as to be turned on by a projection provided on either the removal unit or the cleaning unit when either the removal unit or the cleaning unit is attached to the main unit.

13. The printer according to claim 8, wherein the second detection unit is configured to determine a type of an ink ribbon loaded in the attached unit.

14. The printer according to claim 8, wherein the second detection unit comprises a photo sensor.

* * * * *